April 28, 1942.　　　　R. ANDERSON　　　　2,281,220
GATE CONSTRUCTION
Filed March 24, 1941
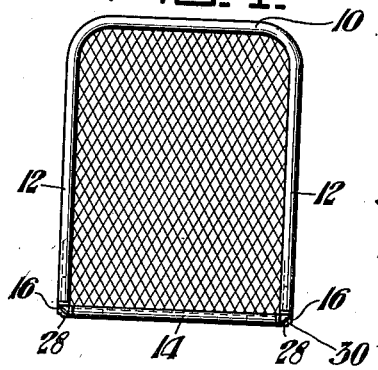
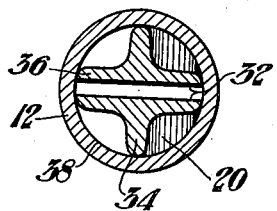
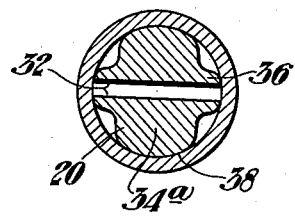
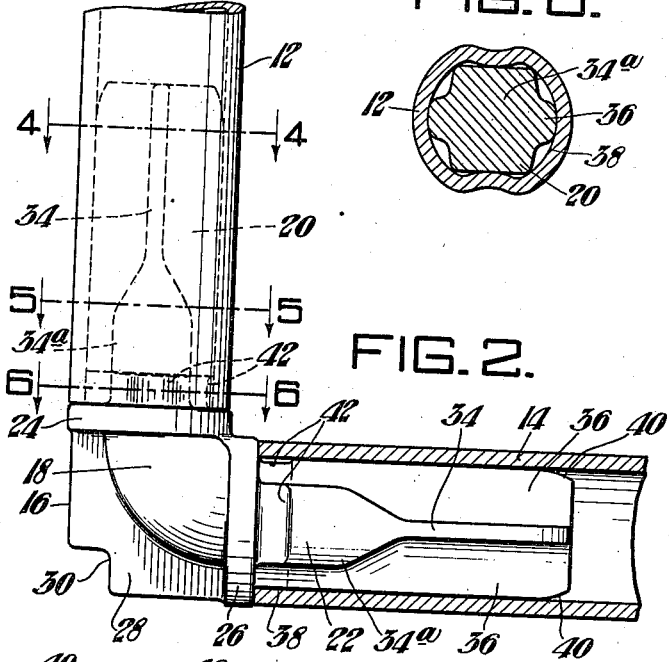
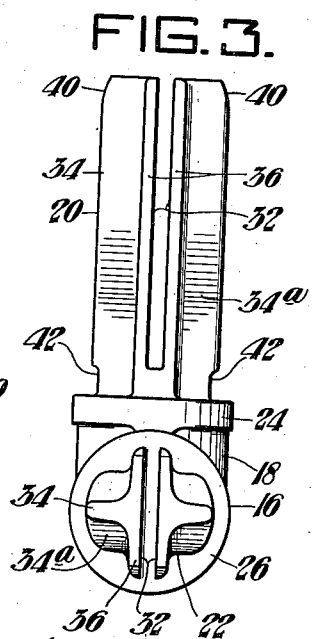
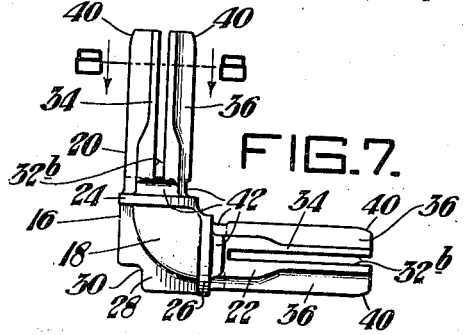
Inventor:
ROBERT ANDERSON,
by: John E. Jackson
his Attorney.

Patented Apr. 28, 1942

2,281,220

UNITED STATES PATENT OFFICE 2,281,220

GATE CONSTRUCTION

Robert Anderson, Waukegan, Ill., assignor to The American Steel and Wire Company of New Jersey, a corporation of New Jersey Application March 24, 1941, Serial No. 384,986

6 Claims. (Cl. 287—54)

The present invention relates to a detailed improvement of gate construction and aims particularly to provide a connecting member for uniting adjacent pipe or tubular frame members used in the construction of a gate.

The invention will be readily understood from a consideration of the accompanying drawing when read in connection with the following detailed disclosure and will be defined with particularity in the appended claims to meet the requirements of the patent statutes.

In said drawing:

Figure 1 is an elevation on a small scale of a gate embodying the invention;

Figure 2 is an enlarged view of the lower left hand corner of the gate shown in Figure 1 illustrating the improved connecting member embodying the invention;

Figure 3 is an elevation of the connecting member shown in Figure 2;

Figures 4, 5 and 6 are cross sectional views taken on the correspondingly numbered section lines of Figure 2;

Figure 7 is a view illustrating a slightly modified form of connecting member; and Figure 8 is a section thereof taken on the line 8—8 of Figure 7.

Referring in detail to the drawing, Figure 1 illustrates by way of example a gate comprising an integral top and side rail members 10 and 12—12 which are conveniently formed of pipe or tubing. These are connected to a bottom rail member 14 formed of the same size tubing. The side rail members 12—12 are connected to the bottom rail member 14 in accordance with the present invention by means of identical fittings, indicated as a whole at 16. Since these fittings are duplicates, a description of one will suffice for both.

The design and construction of the fitting are best shown in Figures 3 to 6, inclusive. In general the fitting resembles a pipe elbow, except that instead of being hollow it is of relatively solid form. It consists essentially of a corner body portion 18 with tongue-like extensions 20 and 22 projecting therefrom in planes at right angles to one another. Flanges 24 and 26 provide abutments for coaction with the extremities of the tubular members 12 and 14. The abutments serve as a positive stop when the fittings are driven on the ends of the tubular members.

On the median line of the body bridging the right angle formed by the flanges 24 and 26 there is a web portion 28 which is cut away, as indicated at 30, to form an angular notch which serves as a positioning means for a truss wire to prevent the same slipping off the fitting.

Each tongue 20 and 22 at its outer end is of the cross sectional contour shown in Figure 4. That is to say, it is split along the center line by the provision of the longitudinal kerf 32. This divides the outer portion of the tongue into two parts so as to endow the same with a limited amount of resiliency.

As will be apparent from a consideration of Figures 4 and 5, each half of the tongue comprises a central rib 34 which is relatively narrow near its outer end and which is of considerably greater width, as indicated at 34ª in the zone where the tongue merges with the abutment flange. This wider portion is illustrated in cross section in Figure 5. It endows the tongue with greater strength and rigidity near the zone where it merges with the body portion of the fitting. At right angles to the ribs 34 each half of the tongue is provided with similar ribs 36—36. The tongue is so proportioned and constructed that the outer extremities of the ribs 36—36 and the rib 34 lie in proper position to firmly engage the inner surface 38 of the circular wall of the pipe or tubing. The extreme ends of the ribs 34 and 36 are either tapered or slightly rounded off, as indicated at 40 so as to facilitate the initial engagement or insertion of the tongues into the end of the pipe or tubing.

One or more notches or indentations 42 are formed in some or all of the ribs 34—36 in the region where the ribs join the abutments. The purpose of these notches is to provide a permanent interlock with the tubular members which is effected by swaging the wall of the extremity of the tubular frame members into the notches in the manner suggested in the cross sectional view of Figure 6.

The elbow connection fittings of the present invention are generally made of cast iron, although forgings or stampings could be used in some instances. Practice has demonstrated that castings can be conveniently and economically produced to serve the intended function. The kerfing of the tongues endows them with sufficient resiliency so that they can be made slightly oversize as compared to the internal diameter of the pipe or tubing which is to be connected. Thus the tongues can be sprung into position. In assembling the parts, the tongues can be driven in by hammer blows applied to the ribs 28. After the fittings are driven to a position in which the abutment flanges 24 and 26 contact the ends of the rails 12 and 14, the two walls of the rail members are swaged or clinched inwardly so that the metal thereof enters the notches 42 thus permanently interlocking the tubular rail members with the notches in the tongues.

In the fitting shown in Figures 1 to 3, inclusive, the kerf 32 divides each tongue into two relatively movable parts. In some cases I may, as shown in Figures 7 and 8, provide kerfs at right angles to one another, as indicated at 32ª and 32ᵇ, thus dividing each tongue into four relatively movable parts, as shown in the sectional view of Figure 8.

The fitting may be termed an internal gate elbow with tongues designed to fit into the interior of the tubular frame members by means of a drive-fit. The described construction has the advantage that when the tubular portions are firmly swaged or clinched into final assembly position there results a compact and rigid gate frame which is devoid of screwed, riveted or welded joints such as generally required by prior constructions.

The kerfed or resilient tongue construction of either Figures 2 or 7 provides means whereby the fitting can be readily driven into the pipe frame without excessive binding due to oversize castings or to undersize internal pipe bore which ordinarily might require reaming the tubes or the grinding of the tongues to proper size to fit. In other words, the kerfed arrangement provides a tolerance which automatically compensates for slight variations in size of either the tongues or the tubing due to inequalities in mass production methods of manufacture.

I claim:

1. A gate structure comprising tubular members connected by an L-like fitting including a body portion having kerfed tongues extending into the members, each tongue having a notched portion and each tubular member having a portion of the wall thereof swaged into a respective notch of the tongue.

2. A gate structure comprising tubular rail members connected by an L-shaped fitting including a body portion having kerfed tongues disposed at right angles to one another and extending into the members, and abutments on the fitting having surfaces at right angles to one another for engaging the respective extremities of said members.

3. A gate structure comprising tubular rail members connected by a fitting including a body portion having kerfed tongues disposed at right angles to one another and extending into the members, and abutments on the fitting having surfaces at right angles to one another for engaging the respective extremities of said members, each tongue having a notched portion and each member having a portion of the wall thereof swaged into interlocking engagement with the respective one of said notches.

4. A connecting member for tubular members comprising a body portion having a plurality of longitudinally kerfed tongues, each tongue having a rib relatively narrow near its outer extremity and considerably wider at the portion where it joins the body portion so as to give greater rigidity in the zone of the body portion.

5. A connecting member for tubular members comprising a body portion having a plurality of longitudinally kerfed tongues, each tongue having a rib relatively narrow near its outer extremity and considerably wider at the portion where it joins the body portion so as to give greater rigidity in the zone of the body portion and each tongue being notched adjacent the body portion to receive a swaged portion of the wall of a tubular member embracing the tongue.

6. A connecting member for tubular sections comprising a body portion having a plurality of longitudinally kerfed tongues, each tongue having a rib relatively narrow near its outer extremity and considerably wider at the portion where it joins the body portion so as to give greater rigidity in the zone of the body portion and each tongue being notched adjacent the body portion, and said body portion having abutments in the zones where the tongues merge with said body portion.

ROBERT ANDERSON.